United States Patent [19]

O'Brien et al.

[11] Patent Number: 5,443,229
[45] Date of Patent: Aug. 22, 1995

[54] AIRCRAFT GAS TURBINE ENGINE SIDEWAYS MOUNT

[75] Inventors: Michael T. O'Brien, Cincinnati; Melvin Bobo, deceased, late of Cincinnati, both of Ohio, by Beatrice L. Bobo, executor

[73] Assignee: General Electric Company, Cincinnati, Ohio

[21] Appl. No.: 165,627

[22] Filed: Dec. 13, 1993

[51] Int. Cl.⁶ .................. B64D 27/00; F02C 7/20
[52] U.S. Cl. ........................ 244/54; 248/555; 60/39.31
[58] Field of Search .............. 244/54, 55; 60/39.31; 248/554, 555, 556, 557

[56] References Cited

U.S. PATENT DOCUMENTS

| | | | |
|---|---|---|---|
| 2,833,494 | 5/1958 | Parker et al. | 244/54 |
| 3,042,349 | 7/1962 | Pirtle et al. | 248/554 |
| 3,397,855 | 8/1968 | Newland | 248/554 |
| 3,675,418 | 7/1972 | Lenkeit et al. | 244/54 |
| 3,809,340 | 5/1974 | Dolgy et al. | 244/54 |
| 3,844,115 | 10/1974 | Freid | 60/39.31 |
| 4,013,246 | 3/1977 | Nightingale | 244/54 |
| 4,022,018 | 5/1977 | Tuten et al. | 244/54 |
| 4,044,973 | 8/1977 | Moorehead | 244/54 |
| 4,213,585 | 7/1980 | Murphy | 244/54 |
| 4,266,741 | 5/1981 | Murphy | 244/54 |
| 4,326,682 | 4/1982 | Nightingale | 244/54 |
| 4,428,189 | 1/1984 | Greenberg et al. | 244/54 |
| 4,471,609 | 9/1984 | Porter et al. | 60/39.31 |
| 4,603,821 | 8/1986 | White | 244/54 |
| 4,821,980 | 4/1989 | Clausen et al. | 244/54 |
| 4,875,655 | 10/1989 | Bender et al. | 244/54 |
| 5,065,959 | 11/1991 | Bhatia et al. | 244/54 |
| 5,277,382 | 1/1994 | Seelen et al. | 244/54 |

FOREIGN PATENT DOCUMENTS 558000 12/1943 United Kingdom ............. 248/556

*Primary Examiner*—Andres Kashnikow
*Assistant Examiner*—Virna Lissi Mojica
*Attorney, Agent, or Firm*—Andrew C. Hess; Bernard E. Shay

[57] ABSTRACT

An aircraft engine sideways mount assembly includes a thrust mount and an engine suspension for suspending the engine structure sideways from the aircraft such that the thrust mount is operable to react substantially all the thrust load forces from the engine to the aircraft. The thrust mount has a thrust bar extending between the engine structure and a structure fixed to the aircraft such that the thrust bar has a line of action which intersects the engine centerline in a support mount plane through which the engine suspension suspends the engine and which is generally perpendicular the engine centerline. The thrust bar has two thrust links pivotably joined to the aircraft at their aft ends and pivotably joined to the engine structure between the pivotal support mounts at their forward ends and include lines of force which intersect the engine centerline at the forward mount plane through which the forward pivotal support mount acts to support the engine.

10 Claims, 4 Drawing Sheets

AIRCRAFT GAS TURBINE ENGINE SIDEWAYS MOUNT

BACKGROUND OF THE INVENTION

1. Field of the Invention

The present invention relates generally to aircraft mounted gas turbine engines, and, more specifically, to a thrust mount which substantially eliminates engine case deflection caused by engine backbone bending due to thrust loads, and which also minimizes casing ovalization.

2. Description of Related Art

A principal type of modern aircraft gas turbine engine in usage today is of the turbofan type. All of the working medium gases are directed through the fan section of the engine. A portion of the working medium gases from the fan section exit is directed through the compression, combustion, and turbine sections of the engine core. The remaining fan exhaust is directed outboard around the engine core. Both the fan discharge and the core discharge flows produce thrust and can be mixed together prior to discharge to improve thermal efficiency or can be discharged individually. The diameter of the engine at the fan stages is typically quite large, on the order of ten feet and larger for high bypass ratio engines of the eighty thousand pound thrust class. Another type of aircraft gas turbine engine is the turboprop engine where a core engine drives unducted props through a gearbox and/or with a free turbine operating with the hot turbine exhaust gases from the core engine or gas generator as it is often referred to. Another type of engine presently under development is the very high bypass ratio engines of both the ducted and unducted type using both pusher and puller fans and which are often driven by a free turbine which is powered by a gas generator or core engine.

Each engine is supported by an aircraft structure, for example, on a pylon extending downwardly beneath the wing or, as in the case of the present invention, sideways on a pylon extending horizontally or sideways from the aircraft fuselage usually at or near the end and tail of the aircraft. The engine is typically mounted and secured to the aircraft by two connections, one towards the forward end of the engine, usually just rearward of the fan section and a second toward the aft end of the engine, typically in the turbine section. The engine static structure is made up of casings and frames. The engine mount is usually attached to an engine frame, a static structure, which supports the rotating components generally referred to as rotors. The engine static structure generally has sub-structures including a forward frame and an aft frame connected by a core engine casing often referred to as a backbone. Forward and aft frames having radially extending structural struts typically support the engine bearings which in turn rotatably support the rotors within hubs of the frames. Typically a dual rotor engine has a forward fan frame and a rear turbine frame that support the main rotor bearings. Many engines have intermediate frames such as an midturbine frame. Frames can support more than one rotor.

The engine casing usually is suspended from the pylon by a forward mount assembly that extends horizontally from the aircraft to interconnect with a forward portion of the engine casing, such as the fan casing, and an aft mount assembly that extends horizontally from the aircraft to interconnect a rearward section of the engine core, such as a turbine frame. Thrust produced by the engine are reacted out through the engine and to the aircraft by the mount assemblies and separate engine thrust mounts.

The advent of large, high bypass turbo-fan jet propulsion engines with their greater flexibility has resulted in relatively large deflections occurring between the engine casings and the rotors of engines that have been mounted to the aircraft by conventional means. This results in rubbing contact between the rotor blade tips and the engine casings or engine designs with larger than desired tip clearances between the rotor and the stator to avoid rubs between the rotor and the stator. When the engines are operated at full power, such as during takeoff, the high thrust loads that act through the engine must be reacted by the engine thrust mounts. Since the engine thrust mounts are generally offset from the longitudinal center of the engine along and through which the thrust acts, bending moments are generated in the engine cases by the offset. The large bending loads resulting therefrom cause deflection of the engine components resulting in interference between the rotor blades and seals and their associated casings.

Excessive blade and seal wear increases the clearance between these components causing a loss of fuel efficiency. In addition, a phenomenon known as blade tip stall may result from larger clearances between the blade tips and the engine casings. This can lead to vibrational problems associated with non-synchronous whirl motion of the rotors. Moreover, when compressor blades rub against their surrounding seal, particles are removed from the blade tips and the seal. The deposition of these particles on the extremely hot turbine sections of the engine can plug cooling holes and roughens the turbine blades and stators and reduces their aerodynamic efficiency. Interstage seals can also wear which will open clearances and reduce fuel efficiency.

One standard technique for eliminating tip rub has been simply to provide larger clearances between the blades and the casing or selectively pre-grind the sections of the casing which are susceptible to tip rub. Typically, clearances are set to be minimum at maximum thrust with the objective of being as small as possible at cruise where fuel consumption has a big impact on aircraft system efficiency. Although this may assist in avoiding blade and seal particles from being deposited on the hot engine sections and avoiding loss of blade tip material, it results in lower fuel efficiency and can cause detrimental vibration of the rotors.

Another approach to reducing tip rubs is to thicken the engine casings and increase the number of rotor bearings to provide stiffening and better concentricity between rotors and stationary parts (casings, seals, frames). This approach, however, is very costly in terms of weight, complexity, and cost. One proposed design, disclosed in U.S. Pat. No. 4,022,018, provides a jet engine mounted in a nacelle structure having a hydraulic actuator disposed between the bottom of the fan casing and the nacelle structure in an attempt to restrain the fan casing against movement relative to the nacelle structure.

U.S. Pat. No. 4,326,682 provides a system for mounting a jet engine sideways to a boom with forward and aft linkages used to fixedly suspend the fan and turbine casing of a turbo fan engine to the boom. The mounts are laterally extending links attached to the casings and boom by clevises which fixedly hold the engine in an axial position with respect to the boom. A thrust tie extends from the rear mount to the inner casing of the engine at an oblique angle such that it intersects the engine centerline in the plane of the front links. The problem with such a design, besides being limited to sideways mountings, is that thrust loads are taken out through outer casings and frames as well as through the thrust ties.

U.S. patent application Ser. No. 07/857,136, now U.S. Pat. No. 5,320,307, entitled "Aircraft Engine Thrust Mount" filed Mar. 25, 1992, and incorporated herein by reference, discloses a gas turbine engine which is typically mounted below an aircraft wing to a pylon at its forward end, an intermediate section, and its aft end for transmitting loads to the pylon. The loads typically include vertical loads such as the weight of the engine itself, axial loads due to the thrust generated by the engine, side loads such as those due to wind buffeting and side accelerations, and roll loads or torques due to rotary operation of the engine. The forward and aft vertical mounts are so designated because they typically carry in-plane loads to the pylon wherein the in-plane loads are those occurring in a single axial plane extending perpendicularly outwardly from the longitudinal axis or centerline of the engine and include vertical and horizontal loads and rotary torque or moments. An aft thrust mount is provided for transferring the axially directed thrust loads from the engine to the pylon which are tension loads during forward propulsion of the aircraft, and compression loads which occur during the use of the engine's thrust reverser during braking of the aircraft upon landing. The thrust mount can be in the front also, in which case the axially directed thrust loads are transferred in tension during thrust reversal and compression during normal thrust.

This thrust mount includes a pair of 90° circumferentially spaced apart elongated thrust links pivotally joined at forward ends thereof to a conventional fan frame and at opposite aft ends pivotally joined to a lever sometimes referred to as a whiffle tree which serves as a mount platform. The two thrust links are pivotally joined to opposite ends of the lever, and the center of the lever is pivotally joined to a platform which is fixedly joined to the pylon. The several thrust link pivotal joints include conventional spherical bearings, which allow slight rotation of the thrust links in three orthogonal planes relative to the fan frame and the lever. And, the lever center joint includes a pin through a bushing for single plane rotation.

It is desirable to provide a load path from the fan frame to the pylon which substantially eliminates bending loads in the engine casing or backbone and the resultant rubbing effects on the rotor, particularly at high power thrust levels. As the size of the thrust load developed by modern turbofan engines has increased, so has the magnitude of the reaction loads and bending moment. An inefficient method of increasing stiffness is to increase part thickness which is a very heavy and costly solution to the problem. It is therefore highly desirable to further reduce the amount of case deflection or backbone bending than that afforded by the elongated thrust yoke mount system in U.S. Pat. No. 4,603,821 and others like it. The resultant engine static structure deflection causes increased rubbing between the rotating hardware and the adjacent stationary hardware. This abrasive wear results in an adverse impact on engine performance and specific fuel consumption, and necessitates more frequent engine maintenance and overhaul. Repair and replacement of rotor blades is one of the highest operating costs for an aircraft gas turbine engine.

Increasing fuel costs and demands for improved durability accentuate the need for low weight designs and systems for substantially eliminating engine case deflection and not just diminishing backbone deflection particularly during high power settings such as at takeoff. The problem is greater for very high bypass ratio engines having both ducted and unducted fans with fan diameters much greater than their core engine diameters. Increasingly, jet engine manufacturers are designing and building engines with increased fan bypass ratios because such engines provide greater propulsive efficiency. There is a great need to substantially eliminate engine case deflection caused by engine backbone bending due to thrust loads.

SUMMARY OF THE INVENTION

The backbone deflection due to the effect of thrust loads, and the resultant backbone bending moment, of a sideways mounted aircraft gas turbine engine, having a rotor assembly rotatably mounted within a static engine structure, is substantially eliminated by an engine mount assembly in accordance with the present invention. The mount assembly provides a thrust mount means and an engine suspension for suspending the engine structure sideways from the aircraft such that the thrust mount means is operable to react substantially all the thrust load forces from the engine to the aircraft. The thrust mount means has a thrust bar means extending between the engine structure and a structure fixed to the aircraft such that the thrust bar means has a line of action which intersects the engine centerline in a support mount plane through which the engine suspension suspends the engine and which is generally perpendicular to the engine centerline.

One particular embodiment of the sideways engine mount assembly of the present invention provides an engine suspension having a forward pivotal support mount and an aft pivotal support mount which pivotably suspends the engine structure at forward and aft mount planes respectively to support the engine sideways from the aircraft. The thrust bar means has two thrust links pivotably joined to the aircraft at their aft ends and pivotably joined to the engine structure between the pivotal support mounts at their forward ends, and which include lines of action which intersect the engine centerline at the forward vertical mount plane (which is perpendicular to the engine centerline) through which the forward pivotal support mount acts to support the engine.

An exemplary embodiment of the present invention provides thrust links that are circumferentially spaced apart 90° at their joints to the engine structure. Preferably, the forward and an aft pivotal support mounts are pivotably joined to the engine structure at forward and aft engine frames respectively of the static engine structure and the two thrust links are pivotably joined to a mid-frame of the static engine structure aircraft between the forward and aft frames. The thrust links and the forward and an aft pivotal support mounts are pivotably joined to a mount beam horizontally supported by spars in a horizontally extending pylon fixedly connected to the aircraft fuselage.

ADVANTAGES

A principal advantage of the present invention is the ability to essentially eliminate bending moment due to thrust in substantially the entire engine structure between forward and aft vertical support mounts to control concentricity of the engine structure about the engine axis and prevent rubbing between the rotor and static structure of the engine and particularly between the rotor blade tips and their seals and interstage seals during high thrust settings of the engine and over a broad range of operating conditions with a minimum of weight. Another advantage of the present invention is that it allows such a thrust mount to be used with large high bypass ratio engines having large fans and extensive plumbing, including pipes and ducts, and engine accessories mounted on the exterior of the engine casing. These advantages result in increased fuel economy and engine component durability due to greatly reduced structure deflection along the rotor of the engine.

The present invention reduces blade and tip seal wear thereby increasing performance during takeoff and cruise, reducing fuel consumption and reducing deposition of metal particles from the compressor blades and tip seals on the very high temperature components of the engine which tend to be expensive. Another advantage of the present invention is that it allows a sideways supported high bypass ratio turbofan engine to be mounted on an aircraft in such a manner so as to minimize the bending flexure and distortion of engine components caused by thrust loads and air loads on the engine inlet cowling.

The foregoing, and other features and advantages of the present invention, will become more apparent in the light of the following description and accompanying drawing.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
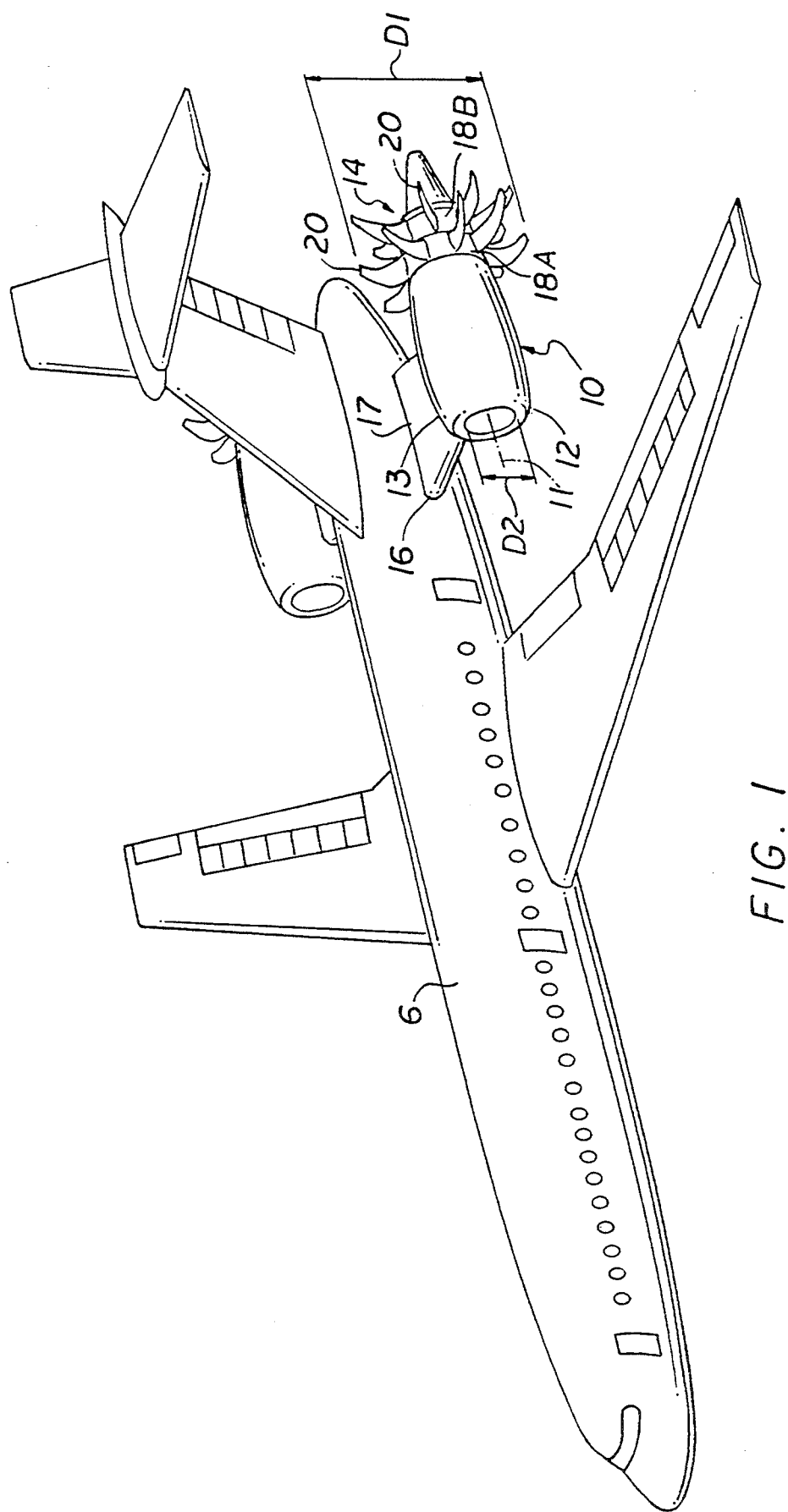
FIG. 1 is a perspective view of a typical aircraft powered by an unducted fan gas turbine engine mounted to the aircraft by an engine mount assembly in accordance with an exemplary embodiment of the present invention.

Illustrated schematically in FIG. 1 is a very high bypass aircraft gas turbine engine 10 of the unducted turbofan type, such as the General Electric UDF GE-36, sideways mounted to an aircraft 6 by an aircraft side strut or pylon 16 having a fairing 17. Note the relatively large fan diameter D1 as compared to the smaller core engine diameter D2. This relatively large difference as compared to more conventional turbofan engines increases the bending moment due to thrust on the core engine thereby further enhancing the usefulness of the present invention. The engine 10 has a longitudinal centerline axis 11 about which is disposed a gas generator section 12 within an engine nacelle 13 which provides motive fluid for the counter-rotating fan section 14 located axially aft of the gas generator section 12. The fan section has counter-rotating rows 18A and 18B of fan blades 20.

Figure 2:
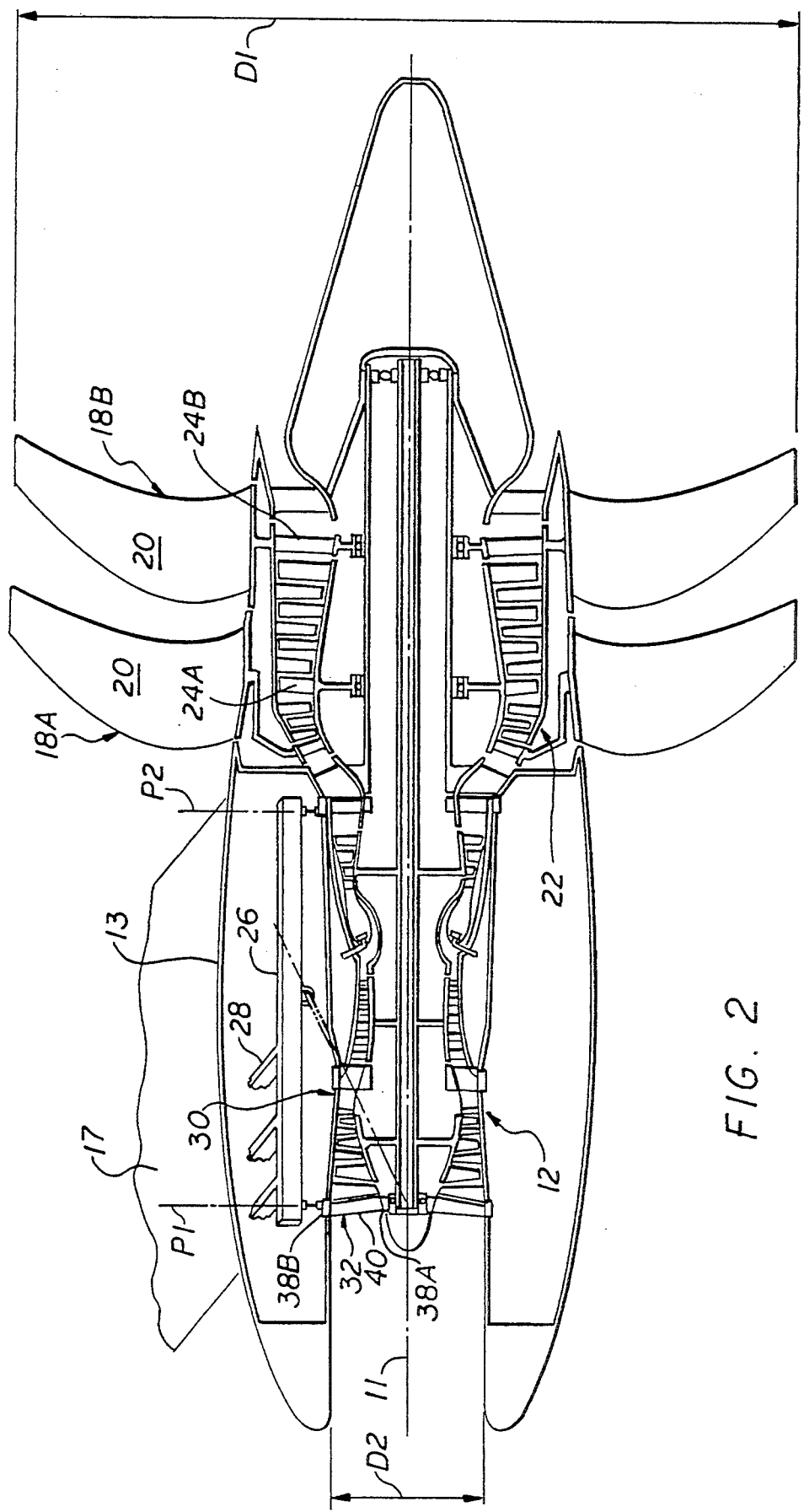
FIG. 2 is a part perspective and part cross-sectional side view of the gas turbine engine and the engine mount assembly depicted in FIG. 1.

Referring now to FIG. 2, the motive fluid supplied by the gas generator section 12 disposed within the nacelle 13 is flowed to a counter-rotating free turbine section 22 having counter-rotating first and second turbine rotors 24A and 24B respectively. The counter-rotating first and second turbine rotors 24A and 24B are drivingly connected to corresponding first and second counter-rotating rows 18A and 18B respectively of the fan blades 20. The counter-rotating free turbine section 22 is operable to rotate the first turbine rotor 24A and the first row 18A of the fan blades 20 in a first circumferential direction and counter-rotate the second turbine rotor 24B and the second row 18B of the fan blades 20 in an opposite circumferential direction about the centerline axis 11.

Figure 3:
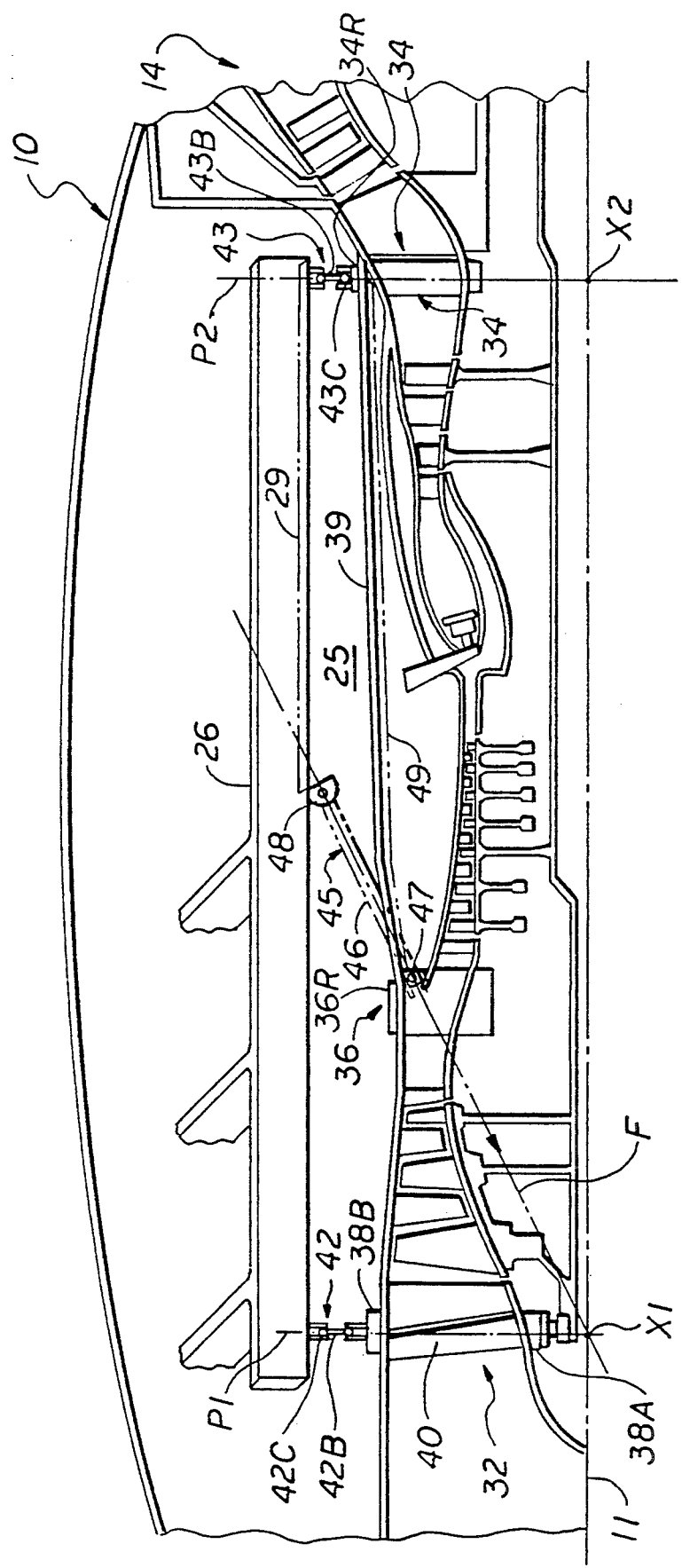
FIG. 3 is an enlarged view of part of the gas turbine engine and the engine mount assembly depicted in FIG. 2.

The present invention provides an aircraft engine mount assembly for mounting the aircraft gas turbine engine 10 to a mounting platform in the form of a beam 26 which is supported by spars 28 located within the fairing 17 of side pylon 16 of the aircraft shown in FIG. 1. Illustrated in more detail in FIG. 3 is the engine mount assembly generally illustrated at 25 for the gas generator section 12 which has an engine structure 30. The engine structure 30 includes a forward frame 32 spaced axially forward of an aft frame 34 and a mid-frame 36 disposed therebetween. The frames are conventionally constructed of annular inner and outer casings 38A and 38B respectively connected by generally radially oriented struts 40 to provide a strong structure to support the engine rotors and mount the engine to the aircraft. The inner casing is often referred to as a hub and the outer casing may be disposed at a radial position which is inward of the radial outer ends of the struts. Frames may also incorporate frame casings radially intermediate of the inner and outer frame casings. The engine structure 30 further includes engine casings 39 rigidly mounted to and between the frames and which are often referred to as the engine backbone. Thrust produced by the counter-rotating fan section 14 is transmitted to the engine structure 30 through a suitable bearing assemblies.

The present invention provides a pivotable engine suspension which includes a pivotable forward support mount 42 and a pivotable aft support mount 43 which are operable to permit limited axial movement of the engine due to differential thermal and mechanical growth. The forward and aft support mounts 42 and 43 respectively include corresponding forward and aft support bar means 42B and 43B respectively which are pivotably joined to the beam 26 at their corresponding ends by pivotable forward and aft joint means 42C and 43C respectively to provide a means to pivot the engine so as to permit limited axial movement of the engine. The forward and aft support bar means 42B and 43B may have various shapes and a number of elements and are referred to as bar means as used with respect to mechanical linkage terminology such as bars and pivotable joints used to form various types of mechanical linkages and devices.

The forward and aft joint means 42C and 43C employ one or more pivotable joints, exemplified by clevis joints, spherical bearing joints, or hinge joints, between the beam 26 and the engine structure 30. Typically these joint means are an assembly of joints and bars which allow for thermal and mechanical growth of the engine structure 30 and therefore are designed to permit limited axial movement of the engine. Such movement can be provided for by a combination of types of joints and predetermined tolerances of the joints to allow enough flexibility of movement (often referred to as slop) in the joint means to permit limited axial movement of the engine. The forward and aft support mounts 42 and 43 act to horizontally support the engine 10 through forward and aft vertical mount planes P1 and P2 respectively that are normal to and intersect the centerline axis 11 at first and second axial centerline positions X1 and X2 respectively.

The present invention further provides a thrust mount 45 which is shown in phantom because it is out of plane (see FIG. 4) and which includes a thrust bar means 46 for transferring essentially all of the thrust loads from the engine structure 30 to the beam 26. The thrust bar means 46 extends from the engine structure 30 radially outward and axially aftward to the beam 26. The thrust bar means 46 is pivotably mounted to the engine structure 30 by a pivotable first thrust joint means 47 and to the beam 26 by a pivotable second thrust joint means 48 to help form a four bar linkage of the thrust mount apparatus of the present invention. The four bar linkage includes the thrust bar means acting as first bar and a second bar 49 formed by a portion of the engine structure 30 between the first linkage joint 47 and the aft support bar means 43B. The aft support bar means 43B acts as a third bar, and a portion of the beam between the aft vertical support bar means 43B and the second thrust joint means 48 provides a fourth bar 29. The present invention provides that the thrust bar means 46 has an effective line of force F which intersects the centerline axis 11 at a first axial centerline position X1 which is the intersection of the centerline axis 11 and the forward vertical mount plane P1.

Figure 4:
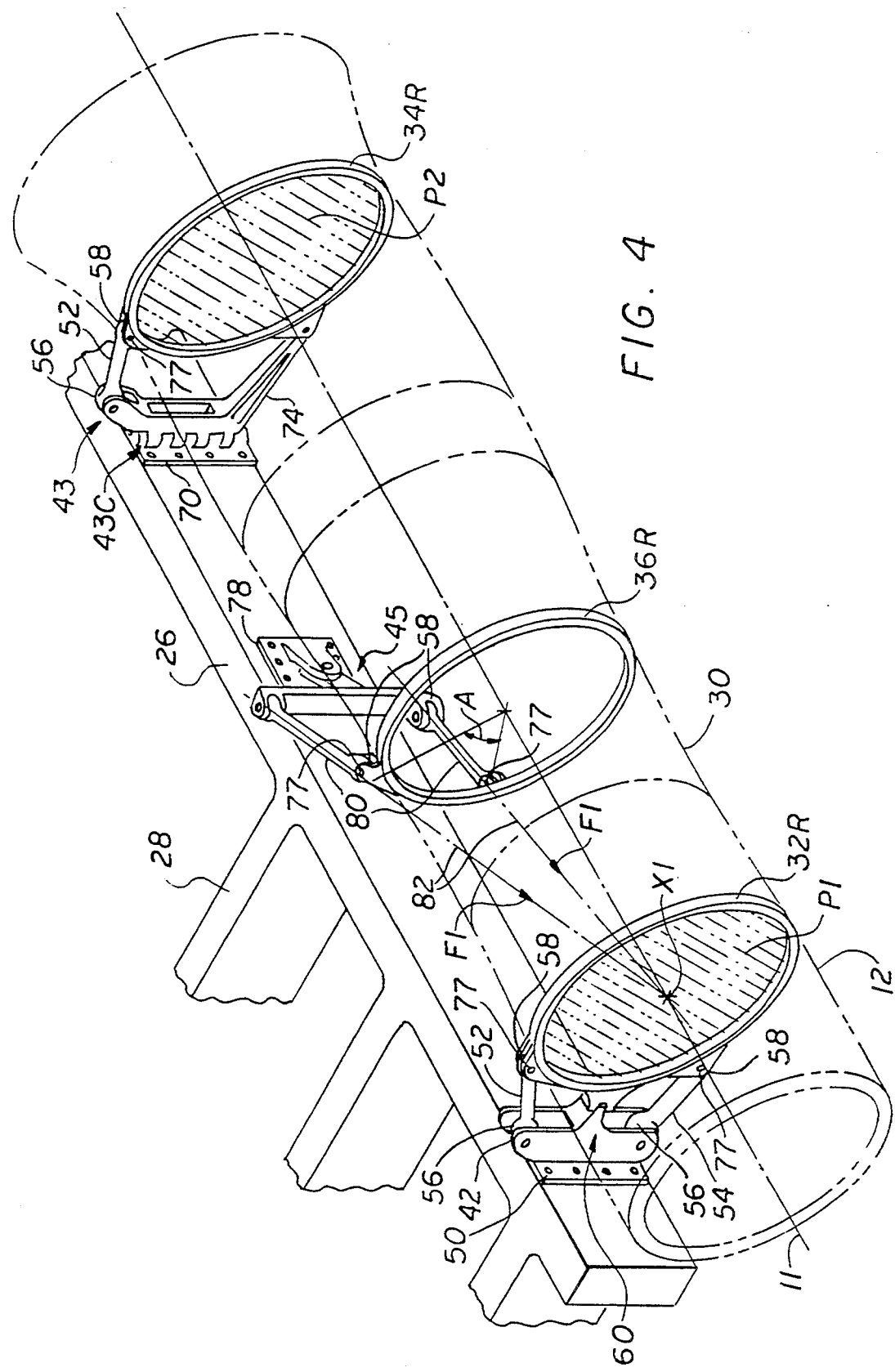
FIG. 4 is a perspective view of an engine mount assembly in accordance with an exemplary embodiment of the present invention.

FIG. 4 illustrates an exemplary embodiment of the engine mount assembly of present invention as it might be applied for use with an unducted fan turbofan gas turbine engine. The beam 26 which is supported by the spars 28 are located within the fairing 17 of the side pylon 16 of the aircraft shown in FIG. 1. The gas generator section 12 of the engine has a structure which includes the forward, mid and aft frames each of which correspondingly includes an annular outer forward frame casing 32R, an annular outer aft frame casing 34R, and an annular outer mid-frame casing 36R. These outer casings are pivotably mounted to the beam 26 by pivotable forward support mount 42 and a pivotable aft support mount 43 which are operable to permit limited axial movement of the engine.

The present invention also contemplates the use of rings to support an engine structure such as rings which are independent or not integral with the engine structure. This allows an engine to be slipped into the independent rings and have the engine bolted or otherwise secured to the independent rings.

The forward support mount 42 is constructed in the form of a forward bracket 50 having an upper support link 52 and a lower support link 54. The support links 52 and 54 are connected to the forward bracket 50 by ball joints 56 and to the outer forward frame casing 32R by clevis joints 58 such that the support links are generally tangential to the outer forward frame casing at clevis pins 77 of the clevis joints. A track and rail support means 60 between the frame casing and the bracket slidably connects the frame casing to the bracket to provide a backup or fail-safe device in case of link failure at the forward support mount 42. The aft support mount 43 and the aft joint means 43C are provided by a hinged aft bracket 70 having an aft upper support link 52 and a lower support arm 74 both of which are hinged relative to the beam 26 so as to permit at least limited axial movement of the engine. The upper link 52 is connected to the bracket 50 by a ball joint 56 and to the outer aft frame casing 34R by a clevis joint 58 such that the upper link is generally tangential to the outer forward frame casing at the clevis pin 77 of the clevis joint.

The thrust mount 45 depicted in FIG. 4 includes a thrust bracket 78 mounted to the beam 26 and provides the thrust bar means 46 with a couple of vertically spaced apart thrust links 80 connecting the thrust bracket to the outer mid-frame casing 36R in an arrangement suitable for transferring essentially all of the thrust loads from the engine structure 30 to the beam 26. The thrust links 80 have respective link axes 82, through which their respective lines of force F1 run, that are angled to intersect the centerline axis 11 at a first axial centerline position X1 which is the intersection of the centerline axis 11 and the forward vertical mount plane P1. Note that the lines of force F1 are vectors which sum to the effective line of force F in FIG. 3. Furthermore, the thrust links 80 are connected to the outer mid-frame casing 36R by clevis joints 58 having clevis pins 77 that are angularly spaced apart an angle A equal to 90° such that the support links are generally tangential to the outer forward frame casing at the clevis joints in order to minimize the "out of roundness" effect on the engine's frame and casing that is associated with thrust mounts having dual thrust links.

While the preferred embodiment of the invention has been described fully in order to explain its principles, it is understood that various modifications or alterations may be made to the preferred embodiment without departing from the scope of the invention as set forth in the appended claims.

I claim:

1. A mount assembly for mounting an aircraft gas turbine engine sideways to an aircraft by the engine's structure which rotatably supports the engine rotor assembly about an engine centerline, said mount assembly comprising;

a pivotable engine suspension including a pivotable support mount for mounting the engine structure sideways from the aircraft and which is operably constructed to permit at least limited axial movement of the engine, a thrust mount having a thrust bar means for reacting out substantially all thrust load forces from the engine to the aircraft, said thrust bar means is pivotably joined to the engine structure and is pivotably joined to the aircraft such that said thrust bar means has a line of action which intersects the engine centerline in a support mount plane through which said support mount suspends the engine and which is generally perpendicular the engine centerline, and said thrust bar means comprises a pair of spaced apart thrust links which are vertically spaced apart at their respective pivotal joints to the aircraft and circumferentially spaced apart at their respective pivotal joints to said engine structure.

2. A mount assembly as claimed in claim 1 wherein said thrust links are circumferentially spaced apart 90° at their respective pivotal joints to said engine structure.

3. A mount assembly as claimed in claim 2 wherein;
said pivotable support mount is a forward pivotable support mount pivotably connected to a forward frame of said engine structure,
said pivotable engine suspension further includes a pivotable aft support mount pivotably connected to an aft frame of said engine structure, and
said thrust links are pivotably connected to an aft frame of said engine structure which is disposed between said forward and aft frames.

4. A mount assembly as claimed in claim 3 wherein said foreword and aft support mounts and said thrust links are pivotably connected to a beam cantilevered from a fuselage of the aircraft by spars in a pylon strut extending sideways from said fuselage.

5. A mount assembly as claimed in claim 1 wherein;
said pivotable support mount is a forward pivotable support mount pivotably connected to a forward frame of said engine structure,
said pivotable engine suspension further includes a pivotable aft support mount pivotably connected to an aft frame of said engine structure, and
said thrust links are pivotably connected to an aft frame of said engine structure which is disposed between said forward and aft frames.

6. An aircraft engine assembly for an aircraft;
a gas turbine engine having a gas generator operably disposed to flow motive fluid to a power turbine which at least in part is drivingly connected to a fan section of said engine,
a mount assembly for mounting said engine sideways to the aircraft by an engine structure which rotatably supports an engine rotor assembly about an engine centerline,
said mount assembly further comprising a pivotable engine suspension for mounting said engine structure sideways from the aircraft and which permits at least limited axial movement of the engine,
said pivotable engine suspension including a pivotable forward support mount pivotably connected to a forward engine frame of said engine structure and a pivotable aft support mount connected to an aft engine frame of said engine structure,
a thrust mount disposed between said forward and aft support mounts, said thrust mount having a thrust bar means for reacting out substantially all thrust load forces from the engine to the aircraft and forming a four bar linkage,
said linkage including first, second, third, and fourth bars wherein said first bar comprises said thrust bar means and is pivotably connected at a first axial end of said first bar to an engine mid-frame of said engine structure and is pivotably joined to the aircraft by a second axial end of said first bar at an axial position on the aircraft between said forward and aft support mounts,
said fourth bar is disposed between first and third bars and said fourth bar fixedly mounted to the aircraft,
said second bar comprises an axially extending portion of said engine structure and which extends from said mid-frame to said aft frame and said second bar is pivotably connected to a first end of said third bar wherein said third bar is a support means of one of said support mounts,
said thrust bar has a line of action which intersects the engine centerline in a support mount plane through which said forward support mount mounts the engine and which is generally perpendicular the engine centerline, and
said thrust bar comprises a pair of spaced apart thrust links which are vertically spaced apart at their respective pivotal joints to the aircraft and circumferentially spaced apart at their respective pivotal joints to said mid-frame.

7. An aircraft engine assembly as claimed in claim 6 wherein said gas generator further comprises in axial succession a compression section, a combustion section, and a turbine section wherein all three of said sections are generally disposed between said forward engine frame and said aft engine frame.

8. An aircraft engine assembly as claimed in claim 7 wherein said fourth bar is a portion of a mount beam fixedly connected to the aircraft by spars in a pylon strut extending sideways from the aircraft and to which said support mounts and thrust mount are connected to the aircraft.

9. An assembly as claimed in claim 8 wherein said thrust mount is an aft thrust mount wherein said thrust mount is disposed intermediate said forward and aft support mounts along said mount beam and said thrust links are pivotably attached to said mount beam at a position axially aft and radially outward, with respect to the engine centerline, of their said respective pivotal joints to said engine structure.

10. An assembly as claimed in claim 9 wherein said power turbine is a counter-rotating free turbine having counter-rotating turbine rotors which are drivingly connected to respective counter-rotating fan stages of said fan section.

* * * * *